United States Patent [19]

Durand et al.

[11] Patent Number: 4,553,816

[45] Date of Patent: Nov. 19, 1985

[54] TUNABLE FABRY-PEROT FILTER

[75] Inventors: William W. Durand, Edina; Anil K. Jain, New Brighton; Ronald E. Peterson, Shoreview, all of Minn.

[73] Assignee: Honeywell Inc., Minneapolis, Minn.

[21] Appl. No.: 467,619

[22] Filed: Feb. 17, 1983

Related U.S. Application Data

[63] Continuation-in-part of Ser. No. 216,420, Dec. 15, 1980, abandoned.

[51] Int. Cl.$^4$ ............................................... G02B 5/28
[52] U.S. Cl. ...................................... 350/166; 356/352
[58] Field of Search ................ 350/164, 163, 166, 1.6, 350/1.7; 356/352

[56] References Cited

U.S. PATENT DOCUMENTS

| | | | |
|---|---|---|---|
| 3,449,692 | 9/1963 | Haake | 331/94.5 |
| 3,466,565 | 12/1965 | Rigrod | 331/94.5 |
| 3,758,194 | 9/1973 | Daval et al. | |
| 3,775,699 | 11/1973 | Cassels | 331/94.5 |
| 4,400,058 | 8/1983 | Durand et al. | 350/166 |

OTHER PUBLICATIONS

Co-pending CIP Application, Ser. No. 216,420, filed 12/15/80, Entitled "Tunable Fabry-Perot Filter".
U.S. application Ser. No. 159,984, filed Jun. 16, 1980, Entitled "Tunable Fabry-Perot Filter".
U.S. application Ser. No. 384,482, filed Jun. 4, 1982, Entitled "Tunable Fabry-Perot Filter".

*Primary Examiner*—Bruce Y. Arnold
*Attorney, Agent, or Firm*—Charles J. Ungemach

[57] ABSTRACT

A tunable Fabry-Perot filter device including at least three low index substrates having a refractive index less than 2.4 and mounted in parallel relationship so as to present two pairs of facing sides to each other in an optical path and a high index, non-metallic or non-absorbing coating having a refractive index of at least 4.0, the high index coating being placed on the facing sides of each of said low index substrates with the thickness of the coating on at least one of the pairs of facing sides being less than the thickness of the coating on the other of the pairs of facing sides, and spacer means for mounting said low index substrates and adjusting the distance between said facing sides. Preferred substrates are potassium halides, cesium halides, and zinc selenide. High index, non-metallic or non-absorbing coatings are preferably from the group of lead telluride, bismuth telluride, germanium telluride and germanium. A high index coating normally has an optical thickness less than or equal to one-half of the minimum wavelength of light to be transmitted through the device. In a preferred embodiment, the spacer means is adapted to adjust one of said pairs of faces to pass the desired wavelength and the other of said pairs of faces is adjusted to pass a wide band width less than the separation between the multiple anharmonic bands. In another preferred embodiment, the spacer means is adapted to adjust one of said pairs to transmit a desired wavelength and the other of said pairs of faces is adjusted to transmit one of the multiple anharmonic bands at the desired wavelength such that only the desired wavelength is precisely tuned at said pairs.

10 Claims, 3 Drawing Figures

TUNABLE FABRY-PEROT FILTER

"The Government has rights in this invention pursuant to Contract No. DASG60-77-C-0071, awarded by the Department of the Army."

BACKGROUND OF THE INVENTION

This application is a continuation-in-part of our prior application Ser. No. 216,420 filed Dec. 15, 1980, entitled "Tunable Fabry-Perot Filter" and is related to now abandoned application entitled "Tunable Fabry-Perot Filter," filed June 16, 1980, having Ser. No. 159,984, but now a continuation-in-part U.S. Pat. No. 4,400,058 entitled "Tunable Fabry-Perot Filter issued Aug. 23, 1983.

Fabry-Perot filters are designed to pass narrow spectral ranges of light at a high efficiency with essentially no transmission of light of different wave lengths near the pass wavelength. These filters do, however, pass light simultaneously at many separate wavelengths called harmonics. This property is acceptable in some applications. U.S. Pat. No. 3,758,194 for example, discloses an interferometer such as a Fabry-Perot filter with a reflective coating and a piezo-electric crystal so that the wavelength of the transmitted radiation may be controlled over a preselected spectral range by changing the spacer thickness. Fabry-Perot interferometers with a piezoelectric crystal and a modulation condenser have also been used in laser modulation systems such as shown in U.S. Pat. No. 3,449,692.

U.S. Pat. No. 3,775,699 discloses a laser having a gas filled Fabry-Perot mode selector where the space between the surface may be varied for tuning purposes. The device shown employs a piezoelectric crystal as does U.S. Pat. No. 3,466,565 which shows a laser mode selection device. Other applications, however, require transmission of a single spectral band, without these side bands, at any given time.

BRIEF DESCRIPTION OF THE INVENTION

It has now been discovered that a fully tunable Fabry-Perot filter device may be built to provide the desired transmission. Specifically, it has been discovered that a Fabry-Perot filter can be built which gives high selectivity of wavelength transmitted and eliminates harmonics of said wavelength to give a more useful transmission. The specific device includes at least three low index substrates having a refractive index less than 2.4 and mounted in parallel relationships so as to present two pairs of facing sides to each other in an optical path. A high index non-metallic coating having a refractive index of at least 4.0 is placed on the facing sides of each of said low index substrates. As used herein, "non-metallic" includes certain dielectric or semi-conductor materials such as germanium, germanium telluride, bismuth telluride and lead telluride which are non-absorbing at wavelengths of 3 to 40 microns and have high indexes of refractions. Spacer means for mounting the low index substrates and adjusting the distance between the pairs of facing sides is provided. Such a construction results in a Fabry-Perot filter which, by varying the distance between the facing sides, transmits relatively narrow wavelength bands of light without harmonics. This is achieved by adjusting each gap between pairs to a different function, as described hereinafter. The Fabry-Perot filters per se are disclosed and claimed in the above mentioned U.S. Pat. 4,400,058 and utilize conventional materials to obtain extremely large spectral ranges through certain unique interference effects which occur between high index coatings and the low index of refraction of the space, e.g., air with a refractive index of 1 or other low index materials such as nitrogen. Low index substrates enhance their effect. In addition to providing an extremely large spectral range, the unique interference effects cause anharmonic filter transmission. Multiple bands transmitted by a filter having a single space as in the above-mentioned U.S. Pat. No. 4,400,058, are therefore not located at the harmonic wavelengths transmitted by filters described in the prior art. While the transmitted bands are often referred to as "harmonics," in the present case they should more properly be referred to as "anharmonics" since they do not follow the usual formula for harmonics, i.e., $\lambda_p = 2d/n$ where d is the distance between the focus and n is an integer 1, 2, 3 - - - etc. Transmission wavelengths of the multiple anharmonic bands in the present invention and that of the above-mentioned U.S. Pat. No. 4,400,058, are determined by high index coating thickness. As a result, two Fabry-Perot filters, each having different high index coating thicknesses will not transmit the multiple anharmonic bands at the same wavelengths. The present invention exploits this property by combining two such filters so as to transmit only a single spectral band at any time. The transmitted wavelength is selected by controlling filter spacer thicknesses using, for example, piezoelectric crystals. While it is unlikely that two such filters will have any more than one common anharmonic wavelength, designing a coating thickness difference between the first and second filters of less than about twenty percent will assure a single transmission wavelength.

It is preferred that the low index substrate have a refractive index less than 2.4 and preferably below 1.8. The various potassium halides such as potassium iodide and potassium chloride have an index of refraction in the order of about 1.6 to about 1.8. The various cesium halides and zinc selenide are other examples of low index substrates having indexes of refraction below 2.4 Particularly preferred is potassium chloride, having an index of refraction of approximately 1.4. The halides are also known to have low absorption characteristics in their transmission regions within the 3 to 40 micron spectral range.

The high index coating which may be a single layer, is placed on the facing sides of the low index substrates and should have an index of refraction of at least 4.0. Preferably, the index of refraction of the coating must be at least twice as high as the index of the substrate and preferably from 3 to 4 times as high. Germanium, and the various tellurides, such as lead telluride, bismuth telluride and germanium telluride are examples of high index materials which can be used as coatings. The thickness of the coating will vary depending upon the substrate and the material, but should have an optical thickness less than ¼ of the wavelength which is the smallest wavelength to be transmitted through the device in order to obtain maximum constructive interference and reflectance. Transmission of the light will occur where the high refractive index coating has an optical thickness of ¼ wavelength. For that reason, the high refraction index coating should have an optical thickness less than one-half of the shortest wavelength being transmitted to prevent transmission of the undesired band of light. Such construction in a single Fabry-Perot filter will pass a narrow spectral band along with the transmission of some anharmonic bands near, but not at, the ½ wavelength, ⅓ wavelength and the like. In the present invention, these multiple bands will be eliminated to permit more extensive use of this device.

The thickness of the coatings and the distance between the faces may be of the order of about ten microns depending, of course, on the desired wavelength to be passed. The distance between each pair of faces coated with the high index coating can be varied through the use of a piezoelectric ceramic, for example, to adjust the device to pass different wavelengths. The piezoelectric device may be as simple as a piezoelectric cylinder connected to an appropriate variable voltage source.

DESCRIPTION OF THE PREFERRED EMBODIMENT

For a more complete understanding of the invention, reference is hereby made to the drawings, in which.

Figure 1:
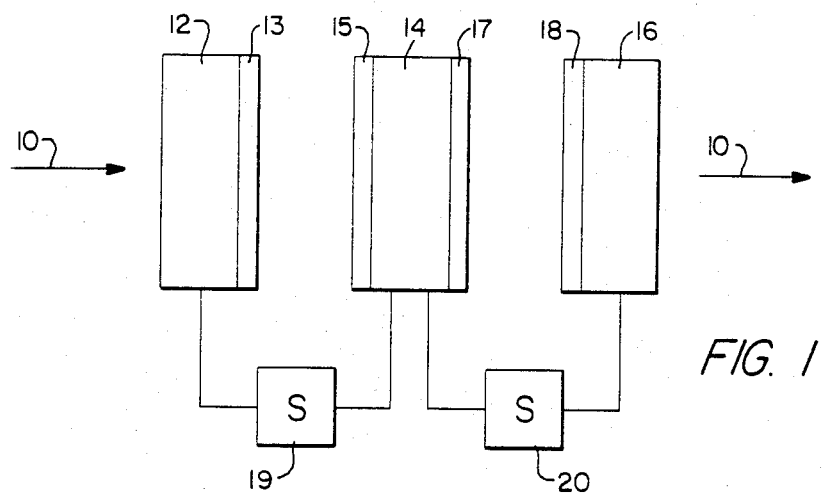
FIG. 1 is a schematic view of the preferred embodiment of the present invention.

As shown in FIG. 1, a light source 10 passes through the device in the direction of the arrow 10. Three low index substrates 12, 14 and 16 having a refractive index less than 2.4 are mounted in parallel relationship so as to present pairs of facing sides to each other in the optical path shown by arrow 10. A high index non-metallic coating or non-absorbing coating 13, 15, 17 and 18 having a refractive index of at least 4.0 is placed on the facing sides of the low index substrates 12, 14 and 16. A non-absorbing coating has only a real refractive index value, unlike metals which may have large imaginary refractive index components. Metallic coatings have a high degree of absorption and have not been found satisfactory for obtaining the wide range effects of the Fabry-Perot filters. For example, metallic coatings generally absorb 60 percent or more of the radiation while dielectric coatings have been found to absorb considerably less than 10 percent of the radiation. Spacer means 19 is provided for mounting the low index substrates 12 and 14 and adjusting the distance between the pairs of facing sides having the coatings 13 and 15. Similarly, spacer means 20 is provided for mounting the low index substrates 14 and 16 and adjusting the distance between the facing sides having the coatings 17 and 18. Of course, instead of substrate 14 having coatings on both sides thereof, two separate substrates could be used with coatings on the sides thereof which face substrates 12 and 16 respectively. In other words, two Fabry-Perot filters such as are shown in the above referred to U.S. Pat. No. 4,400,058 could be used.

As has been discussed here and above, it is preferred that the low index substrates have a refractive index less than 2.4. Preferred substances include those selected from the group consisting of potassium halides, cesium halides, and zinc selenides. Those particularly preferred are potassium chloride and potassium bromide.

It is also preferred that the high index coating be one having an index of refraction of at least 4.0. Examples of suitable materials for this coating consists of members of the group of germanium, lead telluride, bismuth telluride, and germanium telluride.

Figure 2:
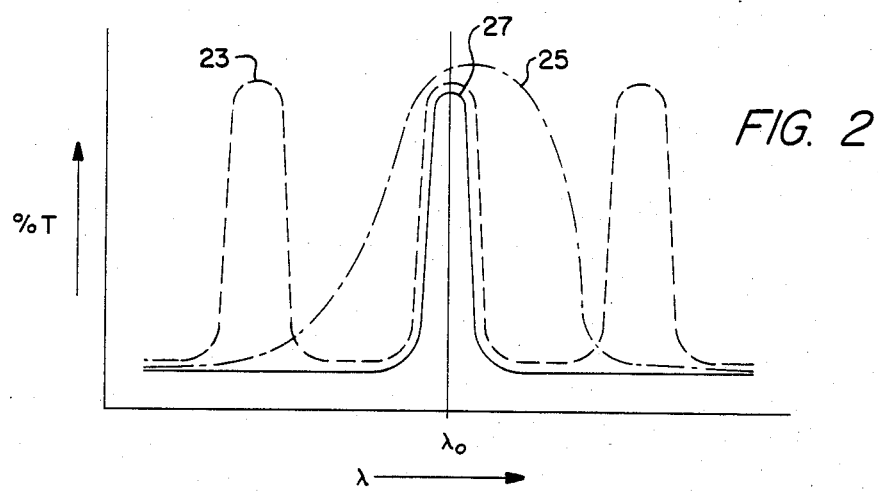
FIG. 2 represent graphically the typical output of one embodiment of the present invention.

Light passing along optical path 10 is normally comprised of a wide variety of wavelengths, only one band of which is of particular interest for a given application. For example, infra-red radiation may be passing along the path 10 and it may be desirable to know the amount, if any, of infra-red at a certain wavelength, such as 17 microns. By a suitable adjustment of spacer means 19, only radiation having a wavelength of approximately 17 microns will pass through the device. However, when employing such a device, the presence of multiple transmission bands at wavelengths shorter than the desired transmission wavelengths is sometimes observed. This situation is shown in FIG. 2 as curve 23 and curve 33 in FIG. 3.

In one embodiment, the second spacer means 20 is tuned to space 17 and 18 to the zero order wherein the distance is substantially smaller than the frequency $\lambda_0$ being transmitted by the first pair 13-15. This substantially smaller gap will permit a wide band transmittance and can be adjusted to have a wide band transmittance as shown by line 25 in FIG. 2 such that the width of the wide band is less than the separation between two anharmonic bands of curve 23. The only wavelength that passes through both pairs 13-15 and 17-18 is that shown by curve 27 and the desired wavelength $\lambda_0$.

Figure 3:
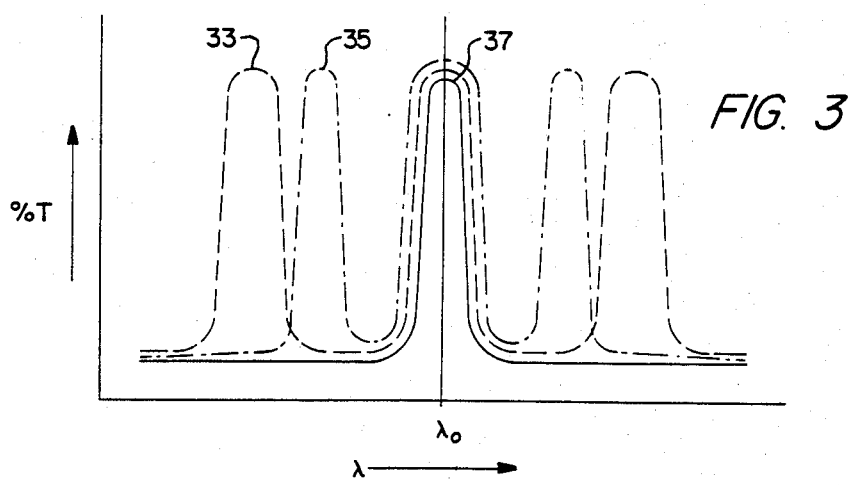
FIG. 3 represents graphically the typical output of another embodiment of the present invention.

In an alternative embodiment, the second filter can be tuned to transmit a different set of bands as shown by curve 35 in FIG. 3. For example, the first curve 33 could be targeted at a desired passband with a $\lambda_0$ at pass, 15 microns. This gap would then transmit anharmonic bands near, but not at, 30 microns, 15 microns, 10 microns, 7½ microns, 6 microns, 5 microns, etc. If the second spacer 20 is tuned to an identical $\lambda_0$ at 15 microns, it will also transmit anharmonic bands near 30 microns, 15 microns, 10 microns, 7½ microns, 6 microns, 5 microns, etc. However, the filter is constructed so that there is a thickness difference between the first coating pair 13-15 and the second pair 17-18 preferably in the order of twenty percent or less, thereby offsetting the anharmonic bands from one another as shown in FIG. 3 by curves 33 and 35. In actual practice, the first gap 13-15 transmits at 15 microns but at 5 microns it might be 5.2 microns in actual practice. The second gap 17-18 may transmit at 4.8 microns and at 15 microns because of the slight coating thickness mis-match, all of the bands other than the selected desired band at $\lambda_0$ will be eliminated and curve 37 will represent the transmission pattern of this embodiment. In effect, the first pair is tuned to transmit one of the unharmonic bands at the desired wavelength and the other pair of faces is tuned to transmit one of its anharmonic bands at the same wavelength such that all of the other anharmonic bands are at different wavelengths and only the desired wavelength is tuned precisely.

Because of its high degree of accuracy, extreme simplicity, and large aperture capabilities, this device is capable of functioning as a spectrophotometer.

Having thus described the invention, what is claimed is:

1. A fully tunable Fabry-Perot filter device, comprising:
    at least three low index substrates having a refractive index of less than 2.4 and mounted in parallel relationship so as to present two pairs of facing sides to each other in an optical path:
    a high index, non-metallic coating having a refractive index of at least 4.0 and an optical thickness less than one half of the minimum wavelength to be transmitted, said high index coating being on said facing sides of each of said low index substrates with the thickness of the coating on at least one of the pairs of facing sides being less than the thickness of the coating on the other of the pairs of facing sides; and spacer means for mounting said low index substrates and for adjusting the distance between either pair of said facing sides.

2. The device of claim 1, wherein said low index substrate is selected from the group of low index materials consisting of potassium halide, cesium halide and zinc selenide.

3. The device of claim 2, wherein said potassium halide is potassium chloride.

4. The device of claim 1, wherein said high index non-metallic coating is selected from the group consisting of lead telluride, bismuth telluride, germanium telluride and germanium.

5. The device of claim 1 wherein each of said spacer means is adapted to vary the distance between said pair of facing sides to pass light of a wavelength ranging from 3 microns to 40 microns.

6. The device of claim 1, wherein said spacer means is adapted to adjust one of said pairs of faces to a desired wavelength and the other of said pairs is adjusted to have a wide band width transmission of less than the separation of the adjacent anharmonic bands from said desired wavelength.

7. A Fabry-Perot filter comprising:

a first filter having two substrates each with an index of refraction less than 2.4 and mounted to present a first pair of facing sides each of which is coated with a first thickness of a non-metallic coating having a refractive index of at least 4.0, the first thickness being less than one half of the desired wavelength to be transmitted;

a second filter having two substrates each with an index of refraction less than 2.4 and mounted to present a second pair of facing sides each of which is coated with a second thickness of a non-metallic coating having a refractive index of at least 4.0, the second thickness being less than the first thickness; and means for positioning the first and second filters in an optical path, the second thickness being chosen to pass the desired wavelength but to block all of the side bands passed by the first filter.

8. Apparatus according to claim 7 further including spacer means connected to the first filter to adjust the spacing between the first pair of facing sides.

9. Apparatus according to claim 8 further including second spacer means connected to the second filter to adjust the spacing between the second pair of facing sides.

10. Apparatus according to claim 7 wherein one of the substrates of the first filter comprises one of the substrates to the second filter.

* * * * *